US008074883B2

(12) United States Patent  (10) Patent No.: US 8,074,883 B2
Morganstein  (45) Date of Patent: Dec. 13, 2011

(54) TOUCH SCREEN INPUT AND IDENTITY VERIFICATION TRANSACTION PROCESSING SYSTEM

(75) Inventor: Sanford J. Morganstein, West Dundee, IL (US)

(73) Assignee: Populex Corp., Elgin, IL (US)

( * ) Notice: Subject to any disclaimer, the term of this patent is extended or adjusted under 35 U.S.C. 154(b) by 0 days.

(21) Appl. No.: 13/073,246

(22) Filed: Mar. 28, 2011

(65) Prior Publication Data

US 2011/0178852 A1 Jul. 21, 2011

Related U.S. Application Data

(63) Continuation of application No. 11/876,397, filed on Oct. 22, 2007, now Pat. No. 7,913,905, which is a continuation of application No. 10/465,896, filed on Jun. 19, 2003, now Pat. No. 7,284,700, which is a continuation-in-part of application No. 10/294,062, filed on Nov. 14, 2002, now Pat. No. 7,306,148, which is a continuation of application No. 10/001,511, filed on Oct. 31, 2001, now abandoned.

(60) Provisional application No. 60/308,465, filed on Jul. 26, 2001.

(51) Int. Cl.
*G06K 17/00* (2006.01)
(52) U.S. Cl. .............................. 235/386; 235/51; 705/12
(58) Field of Classification Search .................. 235/386, 235/50, 51, 56, 57; 705/12, 15
See application file for complete search history.

(56) References Cited

U.S. PATENT DOCUMENTS

| | | | |
|---|---|---|---|
| 3,944,788 A | 3/1976 | Comisar et al. | 235/54 F |
| 4,015,106 A | 3/1977 | De Phillipo | 235/54 F |
| 4,717,177 A | 1/1988 | Boram | 283/5 |
| 4,813,708 A | 3/1989 | Narey | 283/5 |
| 5,189,288 A | 2/1993 | Anno et al. | 235/386 |
| 5,278,753 A | 1/1994 | Graft, III | 364/409 |
| 5,377,099 A | 12/1994 | Miyagawa | 364/409 |

(Continued)

FOREIGN PATENT DOCUMENTS

EP 0 743 620 A2 11/1996

OTHER PUBLICATIONS

James H. Burrows; *FIPS PUB 180—Secure Hash Standard*; Federal Information Processing Standards Publication; U.S. Department of Commerce/National Institute of Standards and Technology; 5 pages, May 11, 1993.

(Continued)

*Primary Examiner* — Karl D Frech
(74) *Attorney, Agent, or Firm* — Baker Botts L.L.P.

(57) ABSTRACT

An advanced voting system is provided that includes one or more computing devices. The computing devices receive input of authentication data and utilize the authentication data to determine whether a voting session by a voter is authorized and to unlock ballot information specific to the voter or a group of voters. Furthermore, same device used to unlock said ballot information. In addition, the receive accessibility input data on the same device used to unlock said ballot information. In addition, the computing devices present ballot questions to the voter if the voting session is authorized based on the received authentication data and receive interactive voter selections from the voter. Furthermore, the system includes a record generator that generates records containing the voter selections.

22 Claims, 6 Drawing Sheets

U.S. PATENT DOCUMENTS

| | | | | |
|---|---|---|---|---|
| 5,412,727 | A | 5/1995 | Drexler et al. | 380/24 |
| 5,450,500 | A | 9/1995 | Brett | 382/162 |
| 5,583,329 | A | 12/1996 | Davis, III et al. | 235/50 A |
| 5,586,196 | A | 12/1996 | Sussman | 382/114 |
| 5,729,334 | A | 3/1998 | Van Ruyven | 356/71 |
| 5,821,508 | A | 10/1998 | Willard | 235/51 |
| 5,875,432 | A | 2/1999 | Sehr | 705/12 |
| 5,878,399 | A | 3/1999 | Peralto | 705/12 |
| 5,901,203 | A | 5/1999 | Morganstein et al. | 379/88.02 |
| 5,956,122 | A | 9/1999 | Doster | 351/210 |
| 5,992,570 | A | 11/1999 | Walter et al. | 186/36 |
| 6,081,793 | A | 6/2000 | Challener et al. | 705/50 |
| 6,205,204 | B1 | 3/2001 | Morganstein et al. | 379/67.1 |
| 6,250,548 | B1 | 6/2001 | McClure et al. | 235/51 |
| 6,641,033 | B2 | 11/2003 | McClure et al. | 235/51 |
| 6,769,613 | B2 | 8/2004 | McDermott et al. | 235/386 |
| 6,817,515 | B2 | 11/2004 | Winnett | 235/51 |
| 6,892,944 | B2 | 5/2005 | Chung et al. | 235/386 |
| 7,036,730 | B2 | 5/2006 | Chung | 235/386 |
| 7,284,700 | B1 | 10/2007 | Morganstein | 235/386 |
| 7,913,905 | B2 * | 3/2011 | Morganstein | 235/386 |
| 2003/0006282 | A1 | 1/2003 | Vadura et al. | 235/386 |
| 2003/0178484 | A1 | 9/2003 | Vadura et al. | 235/386 |
| 2004/0169077 | A1 | 9/2004 | Petersen et al. | 235/386 |
| 2006/0169778 | A1 * | 8/2006 | Chung | 235/386 |

OTHER PUBLICATIONS

The Election Center' *National Task Force on Election Reform*; 6 pages, Jul. 2001.

Caltech MIT Voting Technology Project; *Voting What is What Could Be*; 98 pages, Jul. 2001.

Hawkins, et al.; *Fellow Americans Letter*; 1 page, Jul. 9, 2001.

Caltech-MIT/Voting Technology Project; *Up to 6 Million Votes Lost in 2000 Presidential Election, Voting Technology Project Reveals*; 4 pages, Jul. 16, 2001.

Fidlar Doubleday Inc.; *EV2000 Touch Screen Voting*; 1 page, Printed Jan. 2, 2002.

Fidlar Doubleday Inc.; *The EV2000 Is:*; 1 page, Printed Jan. 2, 2002.

Fidlar Doubleday Inc.; *Bringing Accuracy and Simplicity to the Electoral Process*; 4 pages, Printed Jan. 2, 2002.

Fidlar Doubleday Inc.; *Fidlar Doubleday Global Voting Solutions; Helping you Stay on Top of Advanced Technology*; 2 pages, Printed Jan. 2, 2002.

*Table of Contents*; 1 page, Printed Jan. 8, 2002.

*Samples of Standards to Determine Valid Ballot Marks*; Appendix A, B and C; 9 pages, Printed Jan. 8, 2002.

Caltech-MIT Voting Technology Project; *Voting—What Is, What Could Be*; 1 page, Printed Feb. 19, 2002

David Essex; Technology on the Frontier; *Experts Vote Down Internet Elections*; 7 pages, Mar. 5, 2002.

Populex; *I Want My Vote to Count*; 8 pages, Apr. 2002.

Populex; *Background to the Populex™ Election System*; 4 pages, Apr. 2002.

Charles Keeshan; Daily Herald; *Voting by Computer*; 2 pages, May 14, 2002.

Kurt Allemeier; Q-C Area; *Boland Votes for Touch-Screen System*; 1 page, Jul. 25, 2002.

USPTO; Office Action for U.S. Appl. No. 10/001,511 in the name of Sanford J. Morganstein; 12 pages, Oct. 3, 2002.

*Samples of Standards to Determine Valid Ballot Marks*; Appendix A, B and C; 14 pages, Printed Jan. 22, 2003.

The Election Center; *Election Reform Report*; 70 pages, Printed Jan. 22, 2003.

USPTO; Office Action for U.S. Appl. No. 10/001,511 in the name of Sanford J. Morganstein; 3 pages, Mar. 13, 2003.

USPTO; Advisory Action for U.S. Appl. No. 10/001,511 in the name of Sanford J. Morganstein; 4 pages, Jul. 3, 2003.

USPTO; Office Action for U.S. Appl. No. 10/001,511 in the name of Sanford J. Morganstein; 13 pages, May 20, 2004.

USPTO; Office Action for U.S. Appl. No. 10/294,062 in the name of Sanford J. Morganstein; 13 pages, Jun. 29, 2004.

USPTO; Office Action for U.S. Appl. No. 10/465,896 in the name of Sanford J. Morganstein; 5 pages, Nov. 17, 2004.

USPTO; Office Action for U.S. Appl. No. 10/001,511 in the name of Sanford J. Morganstein; 12 pages, Mar. 14, 2005.

USPTO; Office Action for U.S. Appl. No. 10/294,062 in the name of Sanford J. Morganstcin; 14 pages, Mar. 24, 2005.

USPTO; Office Action for U.S. Appl. No. 10/465,896 in the name of Sanford J. Morganstein; 7 pages, Jul. 28, 2005.

USPTO; Office Action for U.S. Appl. No. 10/294,062 in the name of Sanford J. Morganstein; 14 pages, Nov. 1, 2005.

USPTO; Office Action for U.S. Appl. No. 10/001,511 in the name of Sanford J. Morganstein; 13 pages, Nov. 16, 2005.

USPTO; Advisory Action for U.S. Appl. No. 10/465,896 in the name of Sanford J. Morganstcin; 2 pages, Feb. 27, 2006.

Chu, et al.; W3C; *PICS Signed Labels (Dsig) 1.0 Specification*; 23 pages; printed Mar. 29, 2006.

USPTO; Office Action for U.S. Appl. No. 10/294,062 in the name of Sanford J. Morganstein; 15 pages, Jun. 14, 2006.

USPTO; Office Action for U.S. Appl. No. 10/001,511 in the name of Sanford J. Morganstein; 15 pages, Aug. 10, 2006.

USPTO; Notice of Allowance and Fee(s) Due for U.S. Appl. No. 10/465,896 in the name of Sanford J. Morganstein; 6 pages, Mar. 23, 2007.

USPTO; Notice of Allowance and Fee(s) Due for U.S. Appl. No. 10/465,896 in the name of Sanford J. Morganstein; 4 pages, Jun. 11, 2007.

USPTO; Notice of Allowance and Fee(s) Due for U.S. Appl. No. 10/294,062 in the name of Sanford J. Morganstein; 9 pages, Jul. 31, 2007.

USPTO; Office Action for U.S. Appl. No. 11/876,397 in the name of Sanford J. Morganstein; 6 pages, Aug. 6, 2010.

Notice of Allowance and Fee(s) Due for U.S. Appl. No. 11/876,397 in the name of Sanford J. Morganstein; 6 pages, Nov. 19, 2010.

\* cited by examiner

For President of the United States

Vote for only one by placing an x in the box to the left of the candidate's name or by typing the number displayed next to the candidate's name.

☒ George Washington  10
☐ John Adams  11
☐ Thomas Jefferson  12
☐ Write-in  13

Click here to listen to instructions on your headphones.
Click here to finish voting
Click here to darken the screen You may change your vote by clicking in a different box or by typing the number of a different candidate.

Continue voting by clicking here ↑
Go back one page by clicking here ↓
or you may press the next or previous buttons on the booth's table.

FIG. 4

| RECORD 1 | BALLOT SEQUENCE NUMBER | PAGE | CHOICE1 | CHOICE 2 | ○○○ | CHOICE N | APPARATUS IDENTIFICATION | DATE |
| RECORD 2 | BALLOT SEQUENCE NUMBER | PAGE | CHOICE1 | CHOICE 2 | ○○○ | CHOICE N | APPARATUS IDENTIFICATION | DATE |
| RECORD n | BALLOT SEQUENCE NUMBER | PAGE | CHOICE1 | CHOICE 2 | ○○○ | CHOICE N | APPARATUS IDENTIFICATION | DATE |

TOUCH SCREEN INPUT AND IDENTITY VERIFICATION TRANSACTION PROCESSING SYSTEM

RELATED APPLICATION

This application is a continuation of U.S. application Ser. No. 11/876,397, filed Oct. 22, 2007, by Sanford J. Morganstein, entitled "Advanced Voting System and Method," which is a continuation application of U.S. application Ser. No. 10/465,896, filed Jun. 19, 2003, by Sanford J. Morganstein, entitled "Advanced Voting System and Method," now U.S. Pat. No. 7,284,700, which is a continuation-in-part application of U.S. application Ser. No. 10/294,062, filed Nov. 14, 2002, by Sanford J. Morganstein, entitled "Advanced Voting System and Method," now U.S. Pat. No. 7,306,148, which claims priority to U.S. application Ser. No. 10/001,511 filed Oct. 31, 2001, by Sanford J. Morganstein, entitled "Advanced Voting System and Method," now abandoned, which claims the benefit under 35 U.S.C. §119(e) of U.S. Provisional Application Ser. No. 60/308,465 filed Jul. 26, 2001 entitled "Advanced Voting System." All of these prior applications, including the entire written description, claims, and drawings, are hereby incorporated into the present application by reference.

TECHNICAL FIELD OF THE INVENTION

This invention relates generally to voting, and more particularly to an advanced voting system and method.

BACKGROUND OF THE INVENTION

Voting systems have a variety of underlying objectives. First, a cornerstone of any democracy is an accurate voting system that minimizes disenfranchisement of voters. However, count accuracy is difficult because the large number of voters who participate in an election create variances in ballot output. Another objective of voting systems is to accurately gauge voter intent. Despite this objective, many factors may lead to situations in which voters are unclear as to what is required of them or unclear in indicating their selections. Such factors include ballot design, cumulative voting, multiple positions available for one office, proximity of candidate names on a ballot, unintentional markings left on a ballot, and misspelling of write-in candidates. Additionally, in some elections eligibility requirements or the issues involved restrict who has the right to vote. Thus, voting systems must also attempt to ensure that voters only vote the legal number of times and in the proper jurisdiction.

Methods of voting and counting votes have been in use since the earliest of human times. A paper ballot is a simple voting tool that is usually preprinted with the names of the candidates for a given office. In a paper ballot voting system, the voter marks an 'x' next to each candidate's name for whom the voter cares to vote. To maintain privacy, the voter folds the ballot and hands it to an election judge who deposits it in a ballot box. Alternatively, the voter may be requested to place the ballot in the ballot box himself. A second voting system developed to further these objectives uses mechanical voting machines. Typically, mechanical voting machines have levers next to the names of candidates and counters that increment each time a voter moves a lever to vote on a specific candidate or question. In a third system, the voter is given a paper ballot, called a punchcard, that contains perforated or otherwise weakened areas. The punchcard is inserted into a machine that displays the names of candidates or the questions in a referendum. The alignment of the punchcard in the machine is such that when the voter inserts a stylus next to the candidate's name, a piece of paper is punched out. The paper that is removed is called a chad. The hole in the place where the chad once was can be detected by a light sensitive card reader to determine the vote. In yet another system, the voter is given a paper ballot and the voter is asked to fill in a circle or box associated with the candidate or other ballot question. As is other paper ballot systems, the ballot is placed in a ballot box and is read at a later time. The machine that reads these ballots find light passing through some circles or boxes and not through others. The presence or absence of a mark in a box or circle indicates the voters' choices. Such systems are called "mark-sense" systems or, alternatively, optical scan systems.

Regardless of the system employed, problems have always existed with such systems. The first and foremost deficiency is count accuracy. When it comes to large numbers of ballots, human readers are often more prone to error. Mechanical voting machines improve the counting process by creating a tally for each candidate or question that can be recorded by election officials at the end of the election. Although more accurate, faster, and less labor intensive, mechanical voting machines do not leave an audit trail for authorities to follow in times of a recount. Additionally, voters have become disenfranchised by mechanical voting machines since allegations of tampering with the counters are difficult to dismiss and also because the voter has no assurance that his vote was tallied correctly.

Another deficiency in current voting systems stems from human error in making a selection. Variances in how voters mark a selection and erase a selection may render paper ballots unclear. Punch card systems attempt to replace human counting and selection entry errors with machine certainty, but create problems unique to punch cards. For example, voters may not force the stylus through with enough force to completely remove the chad. When entered into the counting machine, a partially removed chad may be reinserted into the hole nullifying the voter's intent altogether. Furthermore, a punched punchcard cannot be unpunched. An error in making the voter's selection requires the voter to begin the voting process anew.

Furthermore, other problems with a paper ballot voting system are overvoting and undervoting, which occur when a voter either votes for too many candidates or too few candidates, respectively. Mechanical voting machines sufficiently diminish this problem by making it difficult for a voter to vote for more candidates than is appropriate and by reminding the voter when a particular office or question has not been voted on. However, punch card and optical scan systems cannot detect an overvote or undervote until the votes are tallied. Additionally, where ballots are not counted immediately at the polling place, the voter is never afforded the opportunity to correct the situation.

Thus, regardless of the system employed, whether it is conventional paper ballots, mechanical machines, or punchcards, each system has deficiencies that effect the accuracy and efficiency of the voting process. The presidential election of 2000 has increased public awareness and concern about current systems employed.

SUMMARY OF THE INVENTION

According to the present invention, disadvantages and problems associated with previous voting methods and systems have been substantially reduced or eliminated.

According to one embodiment of the present invention, an advanced voting system is provided that includes one or more computing devices. The computing devices receive input of authentication data and utilize the authentication data to determine whether a voting session by a voter is authorized and to unlock ballot information specific to the voter or a group of voters. Furthermore, same device used to unlock said ballot information. In addition, the receive accessibility input data on the same device used to unlock said ballot information. In addition, the computing devices present ballot questions to the voter if the voting session is authorized based on the received authentication data and receive interactive voter selections from the voter. Furthermore, the system includes a record generator that generates records containing the voter selections.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF EXAMPLE EMBODIMENTS

Figure 1:
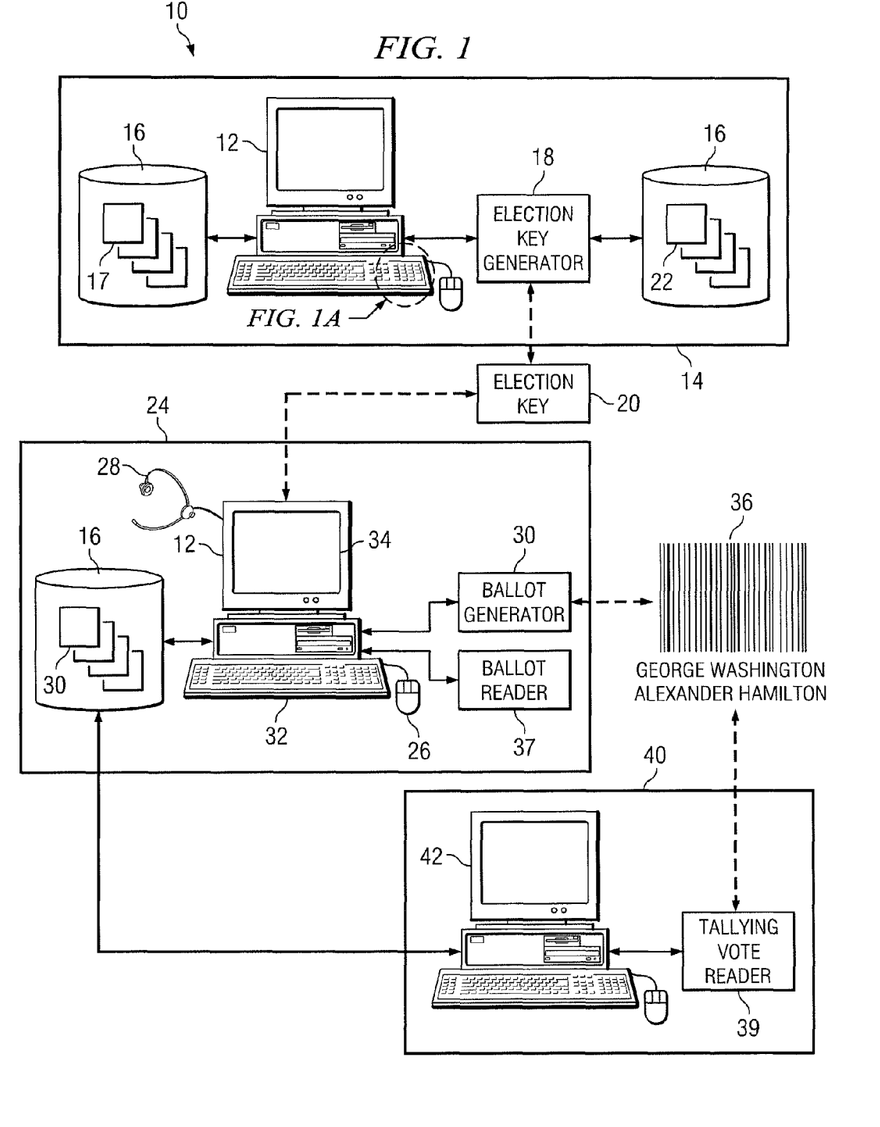
FIG. 1 illustrates an example advanced voting system.

FIG. 1 illustrates an example advanced voting system 10 including one or more computing devices 12 that create an accurate, anonymous, and verifiable record of voters' selections in machine-readable form. Advanced voting system 10 includes a voter identifier system 14 that stores identifying information associated with a voter and verifies the identity of the particular voter at the time of voter check-in at the polling place. Additionally, advanced voting system 10 includes a voting booth 24 that is operable to display ballot questions, receive voting selections from a voter, and generate a ballot encoded with such selections. Furthermore, system 10 includes a tallying system 40 that is capable of decoding an encoded ballot or may communicate directly with the voting booth 24 to tally votes stored within voting booth 24.

Voter identifier system 14 includes a computing device 12, one or more data storage locations 16, and an election key generator 18. A previously created voter signature may be stored as a registration record 17. Registration records 17 are stored in a data storage location 16 that is operable to communicate with computing device 12 or that is included within computing device 12. Registration records 17, used to authenticate the voter's right to vote in the particular election, are described in greater detail below with respect to FIG. 2. For example, an election judge may ask the voter to present a registration card and the signature on the card may be compared against the previously provided signature through the voter identifier system 14.

In one embodiment of voting system 10, identification of the voter through a registration record 17 allows an election key generator 18 to prepare an election key 20. Once a voter's identity has been verified using registration record 17, an election key 20 may be generated to enable the voter to vote in a voting booth associated with voter identifier system 14. Election key generator 18 is operable to communicate with one or more data storage locations 16 and computing device 12 to facilitate generation of the election key 20. The election key 20 may be encoded with a digital signature 22 of a specific election judge. A digital signature is an electronic signature that can be used to authenticate the identity of the sender of a message or the signer of the document. A digital signature is used to ensure that the original content of the message or document that has been sent is unchanged. Digital signature 22 may be specific to the particular precinct at which the voter is authorized to vote and may be stored in data storage location 16. Election key 20 may be a bar coded card, a magnetic stripe card, an optical disc (such as a CD-RW or CD-ROM), a magnetic disc (such as a floppy disk), or any other suitable data storage medium operable to be encoded with digital signature 22 and/or any other appropriate information allowing a voter to vote at a voting booth 24. As another example, election key 20 may include a smart card. A smart card is standard credit card-sized plastic card within which a microchip has been embedded. The smart card may include a memory-only chip, with storage space for data, or may include a microprocessor chip with the ability to process data onboard. Smart cards typically include cardholder verification techniques and security features built into the smart card chips.

The digital signature 22 encoded on election key 20 may be decoded by the computing device 12 on which the voter makes his voting selections to ensure that the voter does not substitute a different ballot from the one the voter is authorized to use. Validation through digital signature 22 also prevents interested parties from procuring copies of a ballot and "hiring" citizens to go into the polling place and deposit a ballot completed by someone other than the voter. Digital signature 22 may also be used when the ballot is read, as is described below. Additionally or alternatively, voting booth 24 may use election key 20 to select the appropriate computer ballot containing the races and questions for which the voter is authorized to vote. In such embodiment, election key 20 may be used to unlock electronic ballot information previously stored at voting booth 24. In another embodiment, an electronic ballot may be stored on election key 20 itself This particular election key 20 may be encrypted using public/private key or any other appropriate encryption technology.

As with a traditional voting system, the voter may be directed to a voting booth that allows privacy for the voter. As described above, system 10 includes one or more electronic voting booths 24 in which a voter may vote (using election key 20, if appropriate). Each voting booth 24 may include an associated computing device 12. In certain embodiments, computing device 12 may be a personal computer which might include such components as a mouse 26, headphones 28, keypad 32, and display screen 34. However, any other computing device, such as a handheld computer with an appropriate input device, may also be used. In an embodiment where a programmable handheld device, such as a personal digital assistant (PDA) or a Tablet PC is used, the programmable device itself, along with its memory may be used to display the ballot, record one or more votes, and communicate the votes to tallying system 40. In such a case, the memory of the handheld device is read and the handheld device is returned to election booth 24 to allow voting by a different voter.

Figure 1A:
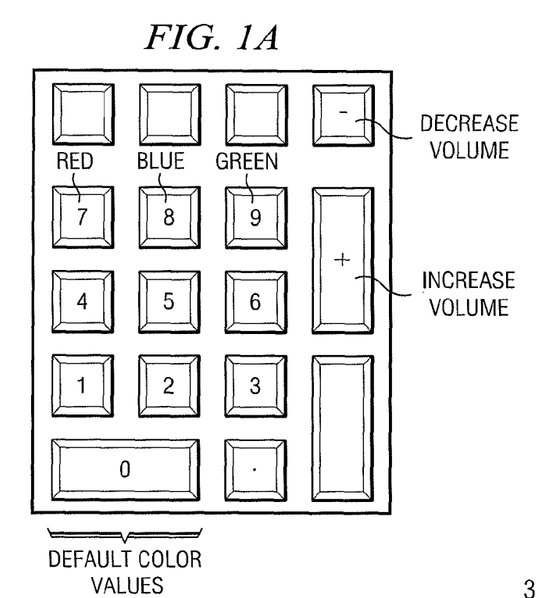
FIG. 1A illustrates example color and volume adjustment key assignments associated with a keypad of the advanced voting system.

One embodiment of the present invention may be used to allow voters to adjust the colors and contrast of screen 34 to improve viewabilty. For example, in one embodiment, the screen colors may be changed by altering the red, green and blue components of the screen background using keyboard keys that are non-dedicated to screen color changes. As used in this invention, non-dedicated means that the keys do not have a dedicated function for all applications on computing device 12. Rather, the keys are used for color adjustments in the voting application, but are used for some other non-visual or non-audible function when used in certain other applications or in the operating system run by computing device 12. Referring to FIGS. 1 and 1A, a voter may be provided with keypad 32 and instructed that selecting the "7" key alters the red content by a fixed amount, selecting the "8" key alters the blue content by a fixed amount, and selecting the "9" key alters the green content by a fixed amount. In one embodiment, selecting the "7," "8," and "9" keys in equal amounts in any desired order may have the effect of adding all three colors in equal amounts, thereby increasing the white content of the screen and thereby increasing the contrast with characters in a black font. In yet another embodiment, the voter may set the red, green, and blue screen color components to default values by selecting the "0" key on keypad 32. The voter may also select the "0" key to initialize the screen colors and, consequently, the screen contrast, whenever a new voting session begins. Although screen color and contrast adjustments are described using red, green, and blue contents, the approach to changing colors and contrast applies equally well to many mixtures of color components. Furthermore, although examples of specific keys associated with specific colors are discussed above, any non-dedicated keys associated with any appropriate screen colors may be used. For example, in another embodiment, two non-dedicated keys may be assigned to each screen color such that selecting one key will increase the value of the associated screen color and selecting the other key will decrease the value of the associated screen color. In one embodiment, after the maximum value of any particular color component is selected by the voter, the next incremental selection of the associated key sets that color component value back to zero (or some other lowest value) such that further incremental selections of the associated key will add that color component again.

In one embodiment, in order to avoid setting the screen colors for one voter in a way that makes it difficult for subsequent voters to view the screen, the screen colors and screen contrast settings may return to default values after a voter completes his voting session.

In one embodiment of the present invention, a computer program may be written in the Visual Basic for Applications (VBA) programming language for altering screen color and contrast. In this example embodiment, display screen 34 of computing device 12 displays a voting form to the voter and keypad 32 contains a numerical keypad. The voting form is programmed so that when any key is pressed on keypad 32 program control is passed to a computer routine called ColorSetting. In one embodiment, the computer code for changing the color of the screen utilizes the voter's selection of the "0" key as a way of setting the screen colors to default values. The voter may also touch the "0" key to initialize the screen colors whenever a new voting session begins. A computer program consistent with the present embodiment may include the following routine:

```
Private Sub ColorSetting(KeyAscii As Integer)
Dim KeyValue As Integer
'The maximum value of any color is 255.
'Adding color values in steps of 32 provides a wide range of colors.
Select Case KeyAscii
Case Key0
'Reset to initial value
RedValue = 127
GreenValue = 127
BlueValue = 127
Case Key7
'Change red
RedValue = (RedValue + 32) Mod 256
Case Key8
'Change blue
BlueValue = (BlueValue + 32) Mod 256
Case Key9
'Change green
GreenValue = (GreenValue + 32) Mod 256
End Select
Me.Section(acDetail).BackColor = RGB(RedValue,
GreenValue, BlueValue)
End sub
```

Figure 7:
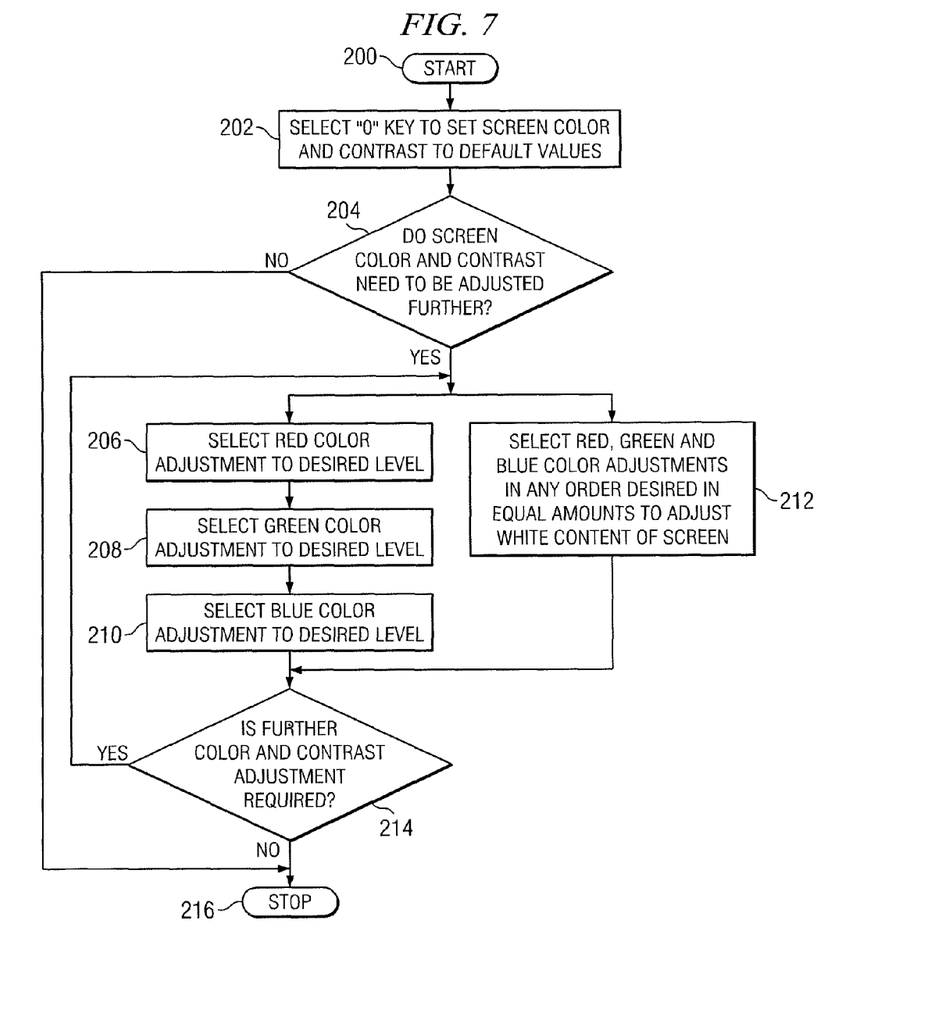
FIG. 7 illustrates an example method of adjusting the display screen color and contrast.

In order to provide a range of screen colors, particular embodiments of the present invention may allow the voter to incrementally add the respective red, green, and blue color content of the screen background in a series of finite steps. Referring to FIG. 7, an example method for adjusting the display screen color in accordance with one embodiment of the present invention begins at step 200. At step 202, the voter may select the "0" key on keypad 32 to reset the screen colors to default values. At step 204, the voter decides if the screen color needs further adjustment based on the needs of the voter. If no further adjustment is required, the method ends at step 216. If further adjustment of the screen color is required, the voter may either select individual red, green, and blue color adjustments in steps 206 through 210, or the voter may select the red, green, and blue color adjustments in equal amounts in any desired order in step 212 to adjust the white content of screen 34. If the voter determines that too much of a color component has been selected and that the color component should be reduced, the voter may continue to select the desired color component key until the maximum value of the particular color component is set. The next incremental selection of that color component key sets the color component value back to zero (or some other lowest value) and the voter may then incrementally add the color component with additional color component key selections until the desired color component level is selected. At step 214, the voter again determines if further screen color adjustment is required. If further adjustment is required, the voter is directed back to steps 206 through 210 or to step 212. If no further adjustment is required, the process ends at step 216.

Although an example method is described, the steps may be accomplished in any appropriate order. For example, adjusting the red, green, and blue color components can be accomplished sequentially, in any order, or simultaneously. The present invention contemplates using methods with additional steps, fewer steps, or different steps, so long as the methods remain appropriate for adjusting the screen color and contrast to enable visually impaired voters to use an advanced voting system.

Particular embodiments of the present invention may also or alternatively be used to allow voters to adjust the volume of the computing device 12 of voting booth 24. For example, in one embodiment, the volume may be changed by increasing or decreasing the volume using keyboard keys that are non-dedicated to volume changes. As used in this invention, non-dedicated means that the keys do not have a dedicated function for all applications on computing device 12. Rather, the keys are dedicated to volume adjustments for the voting application or at specific times within the voting application, but are dedicated to some other function when used in other applications or in the operating system run by computing device 12. Referring to FIGS. 1 and 1A, a voter may be provided with keypad 32 and instructed that selecting the "+" key increases the volume by a fixed amount and selecting the "−" key decreases the volume by a fixed amount. Although examples of specific keys associated with specific volume adjustments are discussed above, any non-dedicated keys associated with any appropriate volume adjustments may be used.

In one embodiment, in order to avoid setting the volume for one voter in a way that makes it difficult or uncomfortable for subsequent voters to hear sounds from the computing device, the volume setting may return to a default value after a voter completes his voting session.

In one embodiment of the present invention, a computer program may be written in the Visual Basic for Applications (VBA) programming language for altering volume. In one embodiment, this program uses the sound mixer functions which are part of the Microsoft Windows operating system. One skilled in the art can readily find code information about control structures and code fragments for the Application Programming Interface on the Microsoft Developer Network website (www.msdn.com). Details can be found by looking for information about "Mixer" and "Volume."

In particular embodiments of the present invention, the voter may be allowed to change the size of the characters and symbols displayed on screen 34 while voting. Changing the size of the displayed characters may be done in an intuitive way so that voters do not need to learn complicated computer instructions. For example, one embodiment of the present invention may use assignable function keys or buttons associated with computing device 12 to allow voters to adjust the magnification level of screen 34. For example, on a Tablet PC computing device 12 running Windows XP, a function key or button may be assigned that, when selected by the voter, executes the "Windows Magnifier" program included with the operating system. As an example, the Compaq TC1000™ Tablet PC has assignable buttons on the computer screen bezel. One of these buttons may be assigned to execute the Windows Magnifier program. A person of skill in the art will understand how the assignment of buttons to various functions is accomplished. The Windows Magnifier program creates a window on screen 34 that can be moved anywhere on the screen. When the voter moves a stylus or mouse over a part of screen 34 where the Magnifier Window is not displayed, a magnified image of that screen area is displayed in the Magnifier Window. Using properties of the Magnifier program and window, one skilled in the art can vary the amount of magnification presented to the voter. In addition, one skilled in the art will recognize that screen color and contrast and screen magnification can be accomplished in combination or separately to provide the voter with a wide range to screen adjustments to enable a voter to tailor the screen display to his particular viewing needs.

Figure 8:
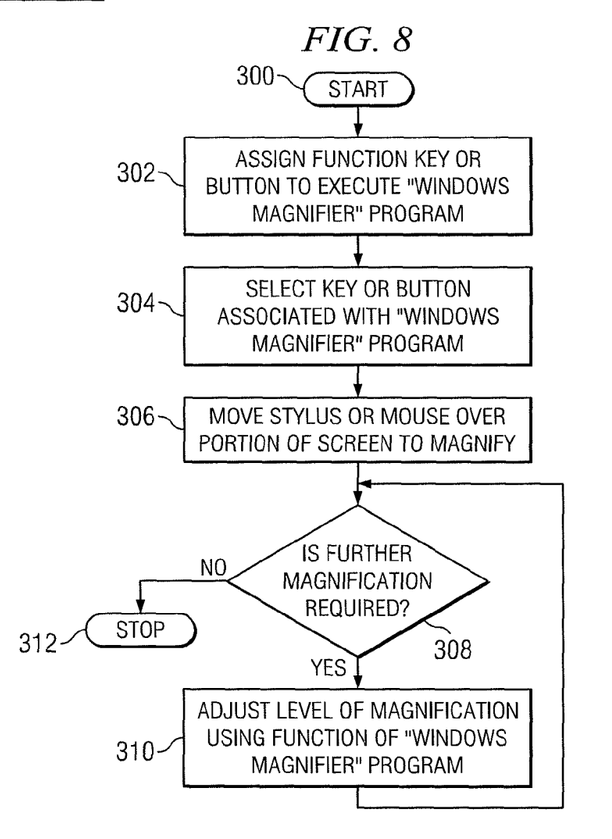
FIG. 8 illustrates an example method of adjusting the display screen magnification.

Referring to FIG. 8, an example method of adjusting the display screen magnification on a Tablet PC begins at step 300. At step 302, the administrator of the voting system, or other suitable person, may assign a function key or button to execute the Windows Magnifier program. At step 304, the voter selects the assignable button associated with the Windows Magnifier program such that the program executes. At step 306, the voter moves the stylus, mouse, or other appropriate indicating mechanism over the portion of the screen that the voter desires to magnify. At step 308, the voter determines if further magnification is required. If not further magnification is required, the method ends at step 312. If further magnification is required, the voter may adjust the level of magnification to the desired amount using the functions of the Windows Magnifier program. After step 310 is complete, the method returns to step 308 to allow the voter to determine if further magnification is required.

Although an example method is described, the steps may be accomplished in any appropriate order. The present invention contemplates using methods with additional steps, fewer steps, or different steps, so long as the methods remain appropriate for adjusting the screen magnification to enable visually impaired voters to use an advanced voting system Referring back to FIG. 1, to initiate voting, computing device 12 may visually and/or auditorily prompt the voter to insert election key 20 into computing device 12 or a peripheral associated with computing device 12. Alternatively, computing device 12 may visually and/or auditorily prompt the voter to press an appropriate button on a keypad 32, press or touch a touch sensitive screen 34 connected to computing device 12, insert a ballot into a ballot reader or printer, or otherwise indicate that the voter is ready to begin. In one embodiment, computing device 12 may auditorily and/or visually ask the voter to insert into computing device 12 a specially coded compact disc (CD) which serves as election key 20. Insertion notification, a feature of some operating systems and CD readers may then be used to start the voting process. As previously described, computing device 12 may use digital signature 22 to verify that election key 20 is valid. Computing device 12 may then present a screen asking whether the voter would like help screens to assist with the voting process. The voter may choose to proceed through help screens or begin voting immediately without such help screens.

Where computing device 12 includes a set of headphones 28, the voter may listen to prerecorded instructions that may have been stored as .wav files or any other appropriate audio files. The ability to provide instructions in an audio format facilitates the voting process for the visually impaired or by others who may not readily understand written text appearing on a computer screen 34. Auditory instructions in a language selected by the voter may also be used to emphasize important steps that the voter must take during the voting process to ensure that the voting process is not compromised. In various embodiments, appropriate auditory instructions may be played throughout the voting process to aid the voter in making voting selections. In a particular embodiment, instructions for using the computing device 12 may have information stored in several languages to accommodate voters for whom English may not be easy to understand. The choice of the language can be encoded in the election key 20 or may be selected by the voter.

The use of such speech files may also be used to provide remote voting over the telephone. One or more computing devices 12 may interface with a telephone system linking a computing device to a voter telephone. The computing device may include any computing device associated with voting system 10. In one example, the voter telephone may be the voter's personal telephone in the voter's home or office. Using the voter telephone, the voter may call into a specified number and be connected with a computing device 12. A computing device 12 may verify the voter's identity using a voice print analysis or any other appropriate technique. A computing device may broadcast recorded auditory instructions to the voter over the voter telephone. The auditory instructions in a language selected by the voter may instruct the voter on how to enter a voter selection. For example, the auditory instructions may instruct the voter to enter a voter selection by pressing a number on the keypad of the telephone in response to the voice messages. Alternatively or additionally, the auditory instructions may instruct the voter to enter a voter selection by speaking at a prompt. When the voter has finished voting (which the voter may indicate or which a computing device may determine), a computing device may generate an encoded ballot 36. The encoded ballot 36 may be used by the election authority to generate or verify ballot totals.

Computing device 12 may proceed to the computer ballot after the voter has received the instructions or has chosen to forego instructions. As an example, the first computer ballot question presented may be for the election of one or more candidates or for a referendum question. Any appropriate ballot formats may be used and presented to the voter. Furthermore, the voter may select a choice on a ballot using keypad 32, mouse 26, touch screen 34, or any other suitable technique. An example computer ballot and the process of indicating a selection on the ballot are described in greater detail below with respect to FIG. 3. Once voter has finished voting for a given ballot question by indicating his selections and by indicating his readiness to proceed to the next question, computing device 12 may determine if an overvote or an undervote has occurred. Alternatively and additionally, computing device 12 may determine all overvotes and undervotes after the voter has voted on all questions. Determining an overvote or undervote in an election in which only one choice is allowed (as for president of the United States) is very simple, as only one selection may be made. However, certain elections may ask the user to select n candidates from a list of m (as for a town council). An overvote occurs when voter selects more than n number of candidates. Conversely, an undervote occurs when voter selects less than n number of candidates. Computing device 12 will detect an overvote condition and proceed according to the rules of the election authority. Such rules could be the allowance of the overvote at voting time but disallowance of the vote at counting time, or not allowing the voter to overvote at all. On the other hand, if an undervote is detected, the voter may be warned that it has occurred and given a choice to proceed without adding another choice or to vote for another candidate.

When the voter has finished voting (which the voter may indicate or which computing device 12 may determine), the voter is presented with a summary on screen 34 showing the voter's selections. The voter may be presented with the choice of printing a completed ballot or returning to voting. When the voter indicates that all choices are final, computing device 12 generates an encoded ballot 36 using ballot generator 30 included in voting booth 24 or otherwise in communication with computing device 12. In one particular embodiment, the encoded ballot 36 includes a barcode encoded with the voter's choices. However, those skilled in the art will realize that generating a ballot 36 may include generating a magnetic card, punching a punch card, or producing any other machine-readable medium. In one embodiment, the encodings on ballot 36 may be printed using magnetic ink character recognition (MICR) technology. MICR is a character recognition system that uses special ink and characters. MICR provides a secure, high-speed method of scanning and processing information. When ballot 36 that contains encodings printed in MICR ink is to be read, ballot 36 is passed through a machine having MICR reading capabilities. The machine magnetizes the ink and then translates the magnetic information into characters. In another embodiment, encoded ballot 36 may also contain a human-readable indicator of the voter's selections (that may also later be read by a document reader employing Optical Character Recognition (OCR) technology). The election authority may decide which type of ballot should be printed by computing device 12.

In addition to or instead of generating ballot 36, computing device 12 may store a voting record 38 of the voter's choices in a data storage location 16. Voting record 38 may be used by the election authority as the official result of the election for that computing device 12 or the election authority may choose the encoded ballot 36 to be the official result. Where the voting record 38 is chosen to be the official result of the election, computing device 12 may communicate directly with a tallying computer 42 which will tally the votes as contained in voting records 38 of one or more computing devices 12. Alternatively, the computing device 12 upon which voter selections are entered may tally the votes directly and report results for that computing device 12. In either case, encoded ballots 36 may be used to verify the result of tallying system 40 in the case of a recount or audit. As such there should be a correlation between the voting records 38 in the memory of computing device 12 and the machine-readable encodings on an associated ballot 36. This correlation may be examined by election or judicial authorities should there be a recount or challenge after the election. By combining electronically tallying voting records 38 and generating encoded ballots 36, a technical advantage may be provided since advanced voting system 10 may offer election authority multiple checks on election results.

Voting record 38 may also contain a unique identifier linking voting record 38 to a particular computing device 12. Voting record 38 is described in greater detail below with respect to FIG. 4. The unique identifier may also be added to the encoded ballot 36. The identifier may be used as a fraud detection device since it would be difficult for counterfeit ballots to contain a code identifying a computing device 12. Additionally, the memory of computing device 12 and the encoded ballot 36 may also be encoded with the digital signature 22 of an election judge. Digital signature 22 may be used as a method of authenticating encoded ballot 36. Using public key technology, ballots 36 so marked have a much smaller chance of being substituted with fraudulent ballots.

Encoded ballot 36 may also include one or more ballot data fields. The ballot data field may be represented by a barcode, magnetic stripe, series of characters printed using magnetic ink character recognition (MICR) technology, or other machine-readable medium. Alternatively or additionally, the ballot data field may include a series of human-readable numbers and/or letters. To prevent fraud, the ballot data field may be unique to a particular encoded ballot 36.

In particular embodiments, the ballot data field may provide information about the election, the voter, and/or the voter's selections. For example, when read by the appropriate machine, the machine-readable ballot data field may translate to:

20021107019923450510203040500xx

Although the digits of the ballot data field may appear random, the ballot data field may include one or more fields providing information valuable to the election authority. In the above example, the first field includes the first eight digits and indicates the date on which the election was held. Thus, the first field of the example ballot data field indicates that the election was held on Nov. 7, 2002. The following field may include the next two digits and may be used to indicate the precinct number in which the vote was cast. For example, the precinct number included in the example ballot is "01". A third field may include two digits recording an identifier associated with the precise computer that the voter used to cast his vote. For example, the ballot data field described above indicates that the voter used computer "99" to cast his vote.

A ballot data field may also include a field recording a double count protection code (DCPC) (such as "2345" in the example ballot data field above). A DCPC may be randomly assigned to each voter voting at the precinct. Each DCPC generated is stored in the voting computer. The voting computer is programmed to consult a table of assigned DCPCs to ensure that no DCPC is assigned more than once. The DCPC of a ballot is read by an appropriate computer when tallying votes, and that computer (and potentially other associated computers) keep a record of which ballots have been tallied according to the DCPC of the ballot. Therefore, if an attempt is made to accidentally or fraudulently recount the ballot, such a recount will be rejected since the DCPC of the ballot is already recorded as having been read. Because the DCPC is randomly assigned, inspection of the DCPC cannot lead to an association of the ballot with a specific voter, and ballot secrecy is maintained.

A ballot data field may also include a series of digits or other indicators that identify the voter's selections. For example, the voter generating the example ballot data field made five choices and voted for candidates "10", "20", "30", "40", and "50". Although digits are used in the example ballot data field, any other appropriate technique may be used for identifying the voter's selections.

Although the ballot data field of an encoded ballot may seem as if it is randomly generated, one studying a series of encoded ballots 36 and ballot data fields may "decode" the arrangement of numbers and/or letters. Accordingly, unscrupulous persons might generate fraudulent encoded ballots 36 in an attempt to effect or compromise the outcome of the election. To prevent fraud, the example ballot data field may also include a field for two or more anti-fraud digits. In the example ballot data field described above, the anti-fraud digits are indicated as "xx." Anti-fraud digits provide a check of all other digits in a ballot data field. The anti-fraud digits may be generated in any appropriate manner, and may be encrypted in a way that is unique for each election (or as often as desired by the election authority). One method of generating the anti-fraud digits sums the digital value of each character in a ballot data field and reduces that sum modulo 99 to arrive at the 2 anti-fraud digits. In one embodiment, before summing, the digital values are looked up on an encryption key that has every possible alphabetic and numeric character code. For example, the string "ABCDEFGHIJKLMNOPQRSTUVWXYZ1234567890" may be an encryption key. Finding the position of the character to be encoded on the key gives the encrypted value. One skilled in the art can use other well-known encryption methods.

A component of voting system 10 may operate to verify the authenticity of the ballot using the ballot data field. For example, ballot reader 37 and/or vote tallying reader 39 may store the anti-fraud digits or the algorithm used to generate the anti-fraud digits and may verify the authenticity of encoded ballot 36 by comparing the anti-fraud digits included in the ballot data field to anti-fraud digits known or generated by ballot reader 37 and/or vote tallying reader 39. Other components of voting system 10 may also be used to verify the authenticity of encoded ballot 36 by verifying the anti-fraud digits appended to the ballot data field.

In some elections, the number of voter choices may be very large. For example, a large number of voter selections are possible in a general election that includes questions regarding the retention of a large number of judges. In such cases, the ballot may contain more than one ballot data field. Alternatively, one or more ballot data fields may include information about the election and/or the voter and one or more other data fields may be used to identify the voter's selections.

Each ballot data field may contain anti-fraud and ECC digits to ensure the integrity of the ballot data field. Furthermore, when more than one ballot data field appears on the ballot, each ballot data field is numbered with the ballot data field number and the total of number of ballot data fields. For example, in one embodiment the ballot data fields appear according to the following form:

12x..x and

22y..y where "12" means that the ballot data field is number one of two and "x..x" is shown to represent the remainder of the first ballot data field, and "22" means that the ballot data field is number two of two and "y..y" is shown to represent the remainder of the second ballot data field. Since the ballot field contains the number of the instant ballot data field and also the count of the total number of ballot data fields, the counting system can determine cases in which one or more ballot data fields is absent or is not read.

Although the example ballot data field described above includes digits for storing information about the election, the precinct, the voter, and the voter's selections, the described ballot data field is for example purposes only. The ballot data field may include any information that is useful to the election authority and this information may be included in any order. In alternative embodiments, the ballot data field may not be coded to include information relevant to the election or the voter. Instead, the ballot data field may include any randomly generated arrangement of numbers or letters. Regardless of the techniques used to generate the ballot data field, the fraudulent duplication of encoded ballots may be prevented where the ballot data field is unique to the particular encoded ballot 36. If during the tallying or verifying process, duplicate ballot data fields are encountered, the encoded ballots 36 with such duplicate ballot data fields may be scrutinized or excluded from the election totals. One skilled in the art will notice that duplication of ballots is prohibited despite the fact that voters may make identical selections. The combination of DCPC, computer number and precinct number is assured to be unique across the entire election jurisdiction for each election.

In certain embodiments of system 10, voting booth 24 may also include a ballot reader 37 capable of reading encoded ballot 36 in the form generated by ballot generator 30. Alternatively, the reader 37 may be shared in a separate private location within the polling place. Voters may use the reader 37 to verify that the encodings on ballot 36 actually express the voter's intent. If after receiving a translation of encoded ballot 36 from ballot reader 37, the voter desires to change encoded ballot 36, the voter may ask an election judge for a new election key 20 and the previously generated encoded ballot 36 may be destroyed. This ensures that in the case where encoded ballot 36 is the official vote, there is no opportunity for the voter who changes his mind to vote more than once.

The next step in the voting process is a formal tallying of the all cast votes using tallying system 40. In one embodiment, tallying system 40 may be at the polling place. The voter may present encoded ballot 36 to an election judge who then inserts encoded ballot 36 into a vote tallying reader 39. Vote tallying reader 39 is preferably capable of reading bar-codes and other machine-readable formats, and may be connected to a tallying computer 42. Additionally, vote tallying reader 39 may be adapted to accommodate reading a large number of ballots 36. The tallying computing device 42 verifies that digital signature 22 of the election judge is correct and also verifies that the ballot data field on encoded ballot 36 has not been used before. This ensures that votes may not be counted twice as a result of confusion at the polling place. The tallying computing device 42 may also check that the computing device identifier, when added to encoded ballot 36, is valid.

To ensure that there is no misreading of the encoded ballot 36, encodings on ballot 36 may include error correcting codes (ECCs). ECCs are derived from the other digits in the encodings and may be used to independently verify that a reading of the encodings is correct. Because an ECC may be derived from the encodings, the ECC may be said to include "redundant information." A system employing ECCs can identify redundant information contained within a character string to determine the presence of errors within the remaining characters of the character string. Example systems employing error correcting codes to detect and correct errors may be found in U.S. Pat. No. 4,334,309, issued to Bannon et al. on Jun. 8, 1982, and U.S. Pat. No. 6,282,686, issued to Cypher on Aug. 28, 2001. As implemented in voting system 10, any computing device 12 within system 10 may include ECC software enabling the computing device to generate, identify, and translate ECCs within the encodings on ballot 36.

In particular embodiments, the ballot data field or other encoding on ballot 36 may include one or more ECCs within the stream of characters or bits comprising the ballot data field or other encoding. For example, the field described above as storing anti-fraud digits may alternatively or additionally store ECCs. In certain embodiments, the anti-fraud digits may serve both purposes. For example purposes only and not by way of limitation, assume that the encodings on ballot 36 include the following binary string: 10110011 10. In this example, the first eight bits of the binary string comprise the ballot data field, and the last two bits of the binary string comprise the ECC. In this example, each digit or bit of the ECC is a function of a four-bit portion of the binary string. The first ECC bit is a function of the first four-bits of the ballot data field, and the second ECC bit is a function of the last four-bits of the ballot data field. The example binary string uses a simple function to create the ECC bits. It is recognized, however, that the function may include any mathematical algorithm applicable to the binary string. The example function merely adds the relevant four bits and determines whether the sum is even or odd. In the example, the ECC digit or bit representing an odd sum is a numeral "1", and the ECC digit or bit representing an even sum is a numeral "0." Accordingly, because the sum of the first four bits is an odd five, the first ECC bit is a "1." Because the sum of the second four bits is an even two, the second ECC bit is a "0." The process of calculating sums over different groups of bits is repeated in order to arrive at a total ECC. Recreating these sums when the characters are read provides the ability to correct single bit errors as described in the references.

Various components of voting system 10 may be software enabled to generate and/or identify ECC digits or bits. In particular embodiments, computing device 12 and ballot generator 30 may generate ECC digits or bits and encode the ECC digits or bits on encoded ballot 36 at voting booth 24. ECC digits or bits may be generated and appended to the ballot data field. Alternatively, ECC digits or bits may be encoded independently on encoded ballot 36. ECC digits or bits may be identified by the placement of the ECC digits or bits in the binary string comprising the ballot data field or by the location of the ECC digits or bits on encoded ballot 36. In particular embodiments, ballot reader 37, vote tallying reader 39, tallying computing device 42, and/or any other computing device within voting system 10 may be enabled with ECC technology. When reading a ballot 36, an ECC-enabled component of voting system 10 may ensure that there are no errors by re-performing the function used to create the ECC digits or bits and comparing the result to the ECCs stored in the binary string. In this manner, components of voting system 10, such as ballot reader 37, vote tallying reader 39, and tallying computing device 42, may verify that the bits within a binary string have been correctly read. ECC technology enables voting system 10 to detect single and double bit errors in the binary string or other encodings on encoded ballot 36, i.e. an error in one or two bits of the ballot data field. The detection of single and double bit errors enables tallying computing device 42 to determine if an encoded ballot 36 should be re-read, discredited, or flagged for visual inspection by the election authority. In particular embodiments, ECC technology may also allow for the automatic correction of single bit errors, i.e. a bit in the ECC does not match an associated portion of the binary string comprising the ballot data field. By automatically correcting single bit errors, tallying computing device 42 may count encoded ballots 36 that might otherwise be discarded or disqualified from consideration.

When polling place tallying is used, tallying computer 42 maintains an ongoing and updated count for votes cast at that particular precinct. If tallying computer 42 loses its memory or must be reset for some reason, encoded ballots 36 can be reread by vote tallying reader 39 to recreate the precinct totals. After the last vote is cast, tallying computer 42 may be used to create a special printed report of precinct totals and may also contain digital signature 22 of an election judge. In one embodiment the report may be called in to a central counting facility, sent by fax or other electronic means, or manually carried to the central counting facility. The special report may also be machine-readable. Thus, the central counting facility need only read, or otherwise tally the special reports of multiple precincts in order to obtain an authority wide result. In another embodiment centralized tallying may be used. In this embodiment tallying computer 42 and vote tallying reader 39 are located at a centralized location rather than at each precinct. As a further alternative, the tallying system 40 may not be necessary at all except for auditing votes in case of a recount or election challenge. In such an embodiment, the vote may be tallied electronically using the voting record 38, as described above.

The various components of system 10 may be associated with one or more computers 12 in one or more locations. For example, some or all of voter identifier system 14, voting booth 24, and tallying system 40 may be located in the same location and be implemented using one or more computing device 12. Furthermore, voter identifier system 14, voting booth 24, and tallying system 40 may share one or more components, if appropriate. Additionally, although data storage device 16 for storing digital signature 22 is illustrated in FIG. 1 as a separate storage location from data storage location 16 for storing registration record 17, it is recognized that all data could be stored in a single data storage location. Similarly, although shown as separate from computing device 12, it is recognized that data storage locations 16 may be included in computing device 12. For example, the hard drive of computing device 12 may serve as a data storage location 16

As a further modification, system 10 may operate without using an election key generator 18 and election key 20. In one embodiment, a voter may be given a ballot after being verified as a registered voter. The voter may take the ballot to voting booth 24 and insert the ballot into ballot generator 30. After completing the voting process, ballot generator 30 may then encode the ballot with the voter's selections to create encoded ballot 36. In an alternative embodiment, the voter need not be given a ballot before entering voting booth 24. Rather, ballot generator 30 may independently create encoded ballot 36. Regardless of whether system 10 includes an election key 20 and regardless of the process used to create encoded ballot 36, encoded ballots 36 may be read, verified, tallied, or otherwise handled by election authority as described above.

A paper ballot voting system, as described above, requires printing specialized ballots prior to each election. In addition to being expensive, a pre-printed paper ballot system requires a sufficient amount of lead time for preparing and printing the ballots. Because system 10 requires no preprinted ballots, system 10 may be leased to an election authority to mitigate election costs. In one embodiment, system 10 could be leased to an election authority for the same cost of preparing preprinted ballots for a printed ballot system.

Figure 2:
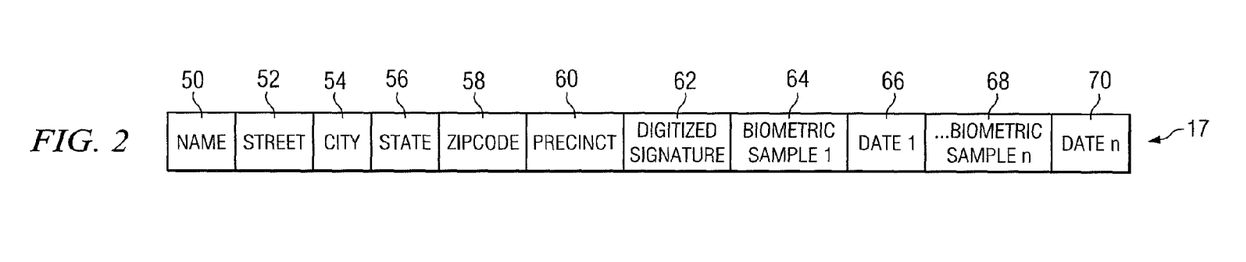
FIG. 2 illustrates an example registration record for use with an advanced voting system.

FIG. 2 illustrates an example registration record 17 for use with advanced voting system 10. Voter registration is also an important part of any voting system 10. In previous systems, a voter registers to vote at an established registration facility or is registered by registrars at ad hoc registration facilities. When the voter registers, the voter typically signs his name. On an election day, when a voter presents himself at a polling place, he identifies himself and his identity may be checked by comparing a signature made at the polling place with the signature made at the time of registration. Previous systems depend on the skill of an election judge to verify that the signature made at the polling place matches the signature made when the voter registered. Election judge's are often not adequately trained in handwriting analysis and an imposter may be able to vote in lieu of the legally registered voter.

According to one embodiment of system 10, a voter registers to vote as described above and provides identification information such as a driver's license indicating the voter's name and address. Pertinent information pertaining to the voter is stored in a registration record 17, as described above with regard to FIG. 1. Registration record 17 may include a number of fields or segments that each includes information or other data relating to the voting process. This information or other data may be in alphanumeric, graphical or any other appropriate format. Contained in the fields within registration record 17 may be the voter's name 50, the voter's street address 52, the voter's city of residence 54, and the voter's state of residence 56 and postal code 58. The address fields 52-58 are often important to the registration process because the address fields may be used to determine the voter's precinct 60, which may also be stored in voting record 38. The address fields 52-58 and/or precinct 60 may also be used to determine the specific ballot questions to be issued to a voter in an election where local issues vary from place to place. The voter may also be required to sign a voter registration card. The signature provided may be used to verify that the person presented is the bona fide registered voter. In one embodiment, an election authority may choose to store an image of voters signature in signature field 62 of registration record 17.

In another embodiment, the voter may be required to provide a biometric sample in addition to or in lieu of the signature 62. A biometric sample may be associated with a high degree of certainty to certain personal, biological characteristics of a person and may be stored for later authentication purposes. The digital representation of a biometric sample may be stored in the biometric field 64. According to the biometric method selected by the election authority, more than one biometric sample may be stored and additional fields 68 for additional biometric samples may be reserved in registration record 17. The analysis of the biometric sample 64 and the linkage of that biometric sample 64 to a voter is called a biometric identification. That biometric identification may be a based on a thumbprint such as disclosed in U.S. Pat. No. 5,729,334, a retinal scan as disclosed in U.S. Pat. No. 5,956, 122, a voice print such as disclosed in U.S. Pat. Nos. 5,901, 203 or 6,205,204, or any other biometric identification or combinations thereof. In order to account for changes in physical characteristics of registrants over time, the dates that each biometric sample was created may be stored in date fields 66 and 70 of registration record 17. As shown in FIG. 1, the biometric identification is stored in data storage location 16. In other embodiments, the election authority may opt to store the biometric identification in a centralized storage database or print the biometric identification on a portable medium such as a magnetic stripe card, bar coded card or other suitable medium.

Registration record 17 is used to authenticate the voter's identity at election time. In one embodiment, when the voter arrives at the polling place, the voter is asked to present a signature and that signature is compared against digitized signature 62. Election judge may also or alternatively ask the voter to present a polling place biometric sample of the same type that was provided when the voter registered and as is currently stored in field 64 or 68 of registration record 17. Polling place biometric sample can be used, in conjunction with appropriate computing facilities, to match the polling place biometric sample with biometric sample 66 stored in the registration record 17. The election authority may opt to store the biometric identification in a centralized storage database or print the biometric identification on a portable medium such as a magnetic strip car, bar coded card, or other suitable medium. One advantage of storing registration record 17 in a portable medium that is retained by the voter is avoiding centralized storage of biometric identification data, which may be seen by some as a threat to privacy. Nonetheless, the election authority may prefer a centralized storage to ensure that voters are not denied the right to vote simply because the voter lost his voter registration card or other medium storing the biometric sample. In such an embodiment, the polling place biometric sample provided by the user may be compared via communication techniques with the biometric sample 66 stored centrally or the centrally stored information may be copied or communicated to computing facilities at the polling place.

Figure 3A:
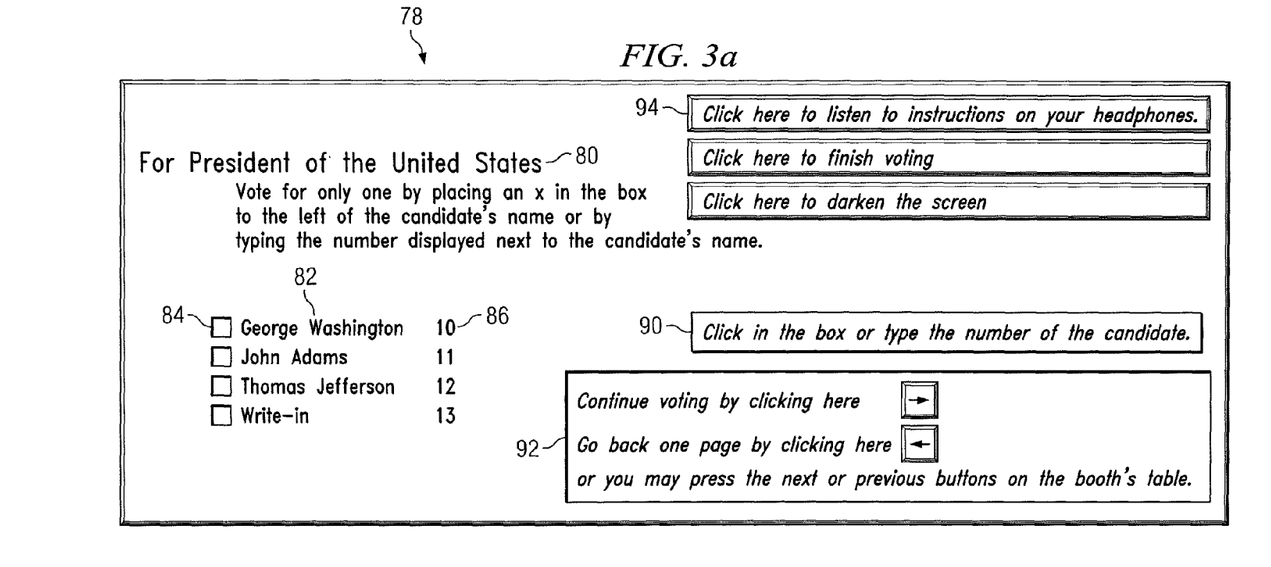
FIGS. 3A and 3B illustrate example computer ballots and computer screen instructions for indicating a selection using an advanced voting system.
Figure 3B:
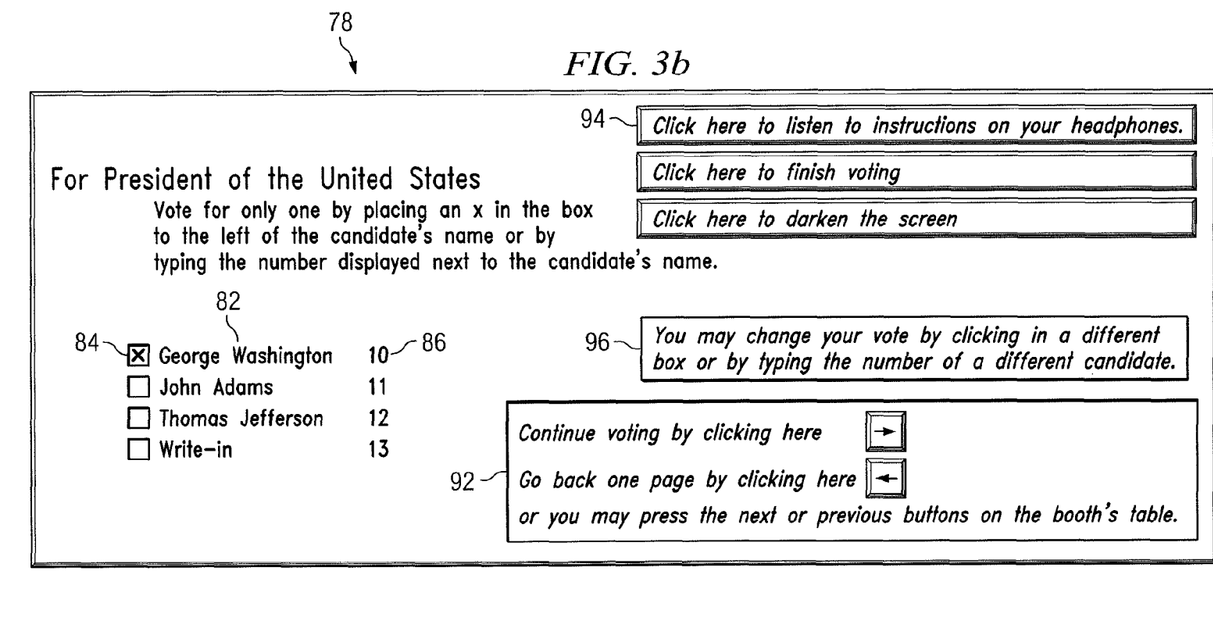

FIGS. 3A and 3B illustrate particular embodiments of example computer ballots 78 and computer screen instructions that may be used in conjunction with system 10. If the ballot question is for an office, as illustrated in FIGS. 3A and 3B, the voter is shown a screen that states the name of the office 80 and displays the names 82 and party affiliations of all candidates. Certain races, such as that for the President of the United States, may have coupled candidates such as president and vice president. The candidate names 82 and other information identifying the candidates are each displayed along with a check box 84. Near to, and associated with the name of the candidate, may also be a candidate number 86.

FIG. 3A illustrates a computer ballot 78 prior to the voter's selection of a candidate. In one embodiment, the voter expresses a choice by using mouse 26 or other appropriate input device to click on or otherwise make a selection of the candidate name 82, the box 84 next to candidate name 82, or the candidate number 86. Those skilled in the art will understand that a touch sensitive screen 34 may also or alternatively be used and the voter may touch the candidate's name 82, box 84 or number 86 to express a choice. Particular embodiments of the present invention also provide alternative methods for the voter to express a choice. As an example only, the voter may type the name 82 or number 86 of the candidate and, in so doing, the choice may be indicated in the box 84 next to the candidate name 82, as illustrated in FIG. 3B. Election authorities may choose to have one, a combination of more than one, or all of these selection methods available to voter. Alternatively or additionally, the voter may also be able to indicate the desire to vote for all candidates with a particular party affiliation in a number of different races. Where desirable, voting system 10 may also support cumulative voting in one or more races.

A computerized voting system 10 may be new to many voters who are not experienced in using computers. Therefore, in one embodiment, the voting authority may decide to present only one question at a time on screen 34. Also, context sensitive instructions may appear on screen 34 after each voter action. According to one embodiment, when a ballot question 78 first appears, instructions 90 may be displayed on the screen regarding how to select a candidate and instructions 92 may be displayed regarding how to proceed to the next or previous questions. Instructions to the voter may be placed in a part of the screen that is not related to voting. To further minimize voter confusion, instructions to the voter may be displayed in a different typeface, color and/or font size. Additionally, an election authority may decide to include instructions 94 informing the voter that spoken instructions are available on a headset 28 if the voter clicks on instructions 94. As is illustrated in FIG. 3B, after the voter indicates a selection, the context sensitive, on-screen instructions 96 may be displayed to inform the user how to change his selection. The voter may then proceed with the next question or may return to a previous question.

Particular embodiments also provide the ability to guide the voter through casting a write-in ballot. Some election jurisdictions do not count write-in votes unless a candidate has properly registered as a write-in candidate. In that case, the voting system 10 may show a box on the screen indicating that write-in votes may be made when a voter has a write-in choice. The voter may be allowed to select "write-in" as a candidate choice using any of the above described methods. Once selected, an instruction may appear explaining that the voter will be able to write the name of the write-in candidate on encoded ballot 36 once produced by ballot generator 30. A space may be created on encoded ballot 36 allowing the voter to add such a name. The fact that there is a write-in candidate on the computer ballot is encoded in ballot 36 to allow for manual processing of the write-in. Alternatively, the voter may be instructed that he should type the name of the write-in candidate on keyboard 26 or otherwise enter the candidate's name. The voter may also or alternatively write-in the name manually.

As mentioned above, particular embodiments of the present invention allow the visually impaired or those who are not proficient in reading to vote. If the voter selects to listen to instructions on headphones 28 as described above, the voter is guided through the voting process by prerecorded spoken instruction. The name of the office and the candidates names are spoken to let the voter know who all the candidates are. The list may be repeated to minimize confusion. The voter may then be told to press a mouse button 26, press anywhere on the touch sensitive screen 34, or take any other appropriate action to indicate the selection of a candidate whose name is spoken at that time. To ensure the user's selection was properly registered, the system may then repeat to voter the selection that was made. Similarly, computing device 12 may speak instructions to voter on how to proceed (for example, "click now to go back" or "click now to go forward"). The voter's intent is registered by the time proximity between the spoken prompt and voter's pressing of the button or other appropriate action.

In one embodiment, the election authority may decide at the time the user leaves each ballot question to perform an undervote/overvote test, as described with regard to FIG. 1. Again, depending on a particular embodiment and election laws, overvotes and undervotes may or may not be allowed. According to the options provided by particular embodiments, the user may be warned that an undervote or an overvote has occurred at the time the voter leaves a ballot question. Alternatively or additionally, such warnings may be presented to the voter at the end of the voting session, according to the rules of the election authority.

Figure 4:
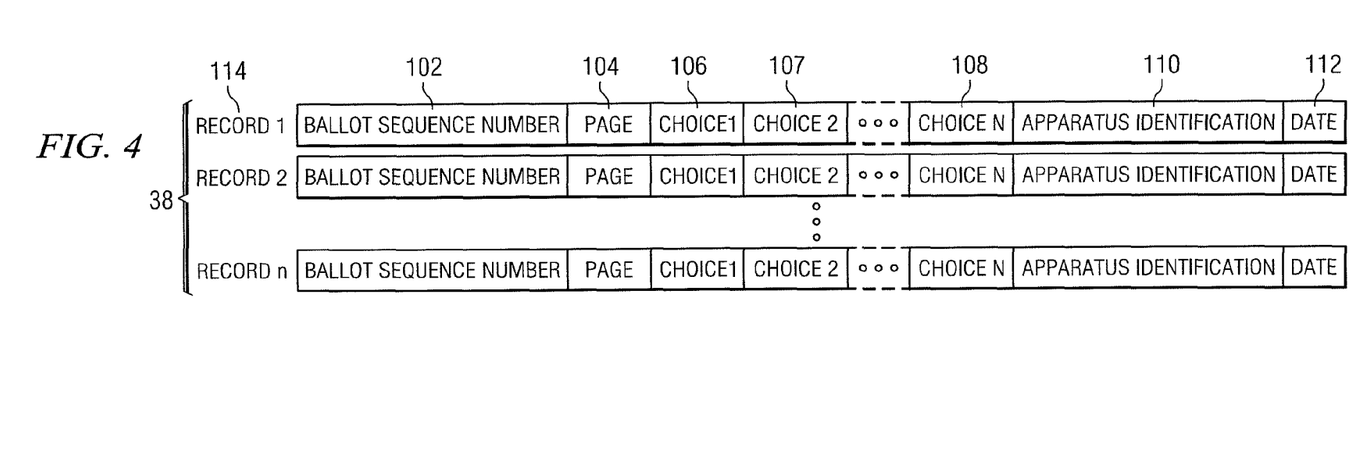
FIG. 4 illustrates a voting record that may be generated by an advanced voting system.

FIG. 4 illustrates a voting record 38 that may be generated by system 10. As described with regard to FIG. 1, system 10 maintains a voting record 38 of each vote on each question as selected by the voter. Voting record 38 may contain the ballot data field 102 described above, the ballot page 104 for which the voter made a selection, and each choice 106 made by voter. For an election, such as for president, where only one vote may be cast, only one choice 106 will have been recorded in voter register 38. By contrast, elections for offices electing more than one candidates to a position, such as town council, several choices 106 will be recorded in voting record 38. An example embodiment of the present invention allows up to 32 choices per ballot page 104. Furthermore, an apparatus identifier 110 may identify a particular computing device 12 used by the voter to prevent fraud. The date 112 of the election may also be stored in voting record 38 as a further check. In an effort to protect the identity of the voter, election authority may choose to record only the date, and not the time, of the registration of a choice 106. A different record 38 may be stored for each different ballot question. For a given voter, the ballot data field 102 is the same in each such record 38. This allows each voter to review on his or her choices and protects choices made by other voters from being accessed.

Figure 5:
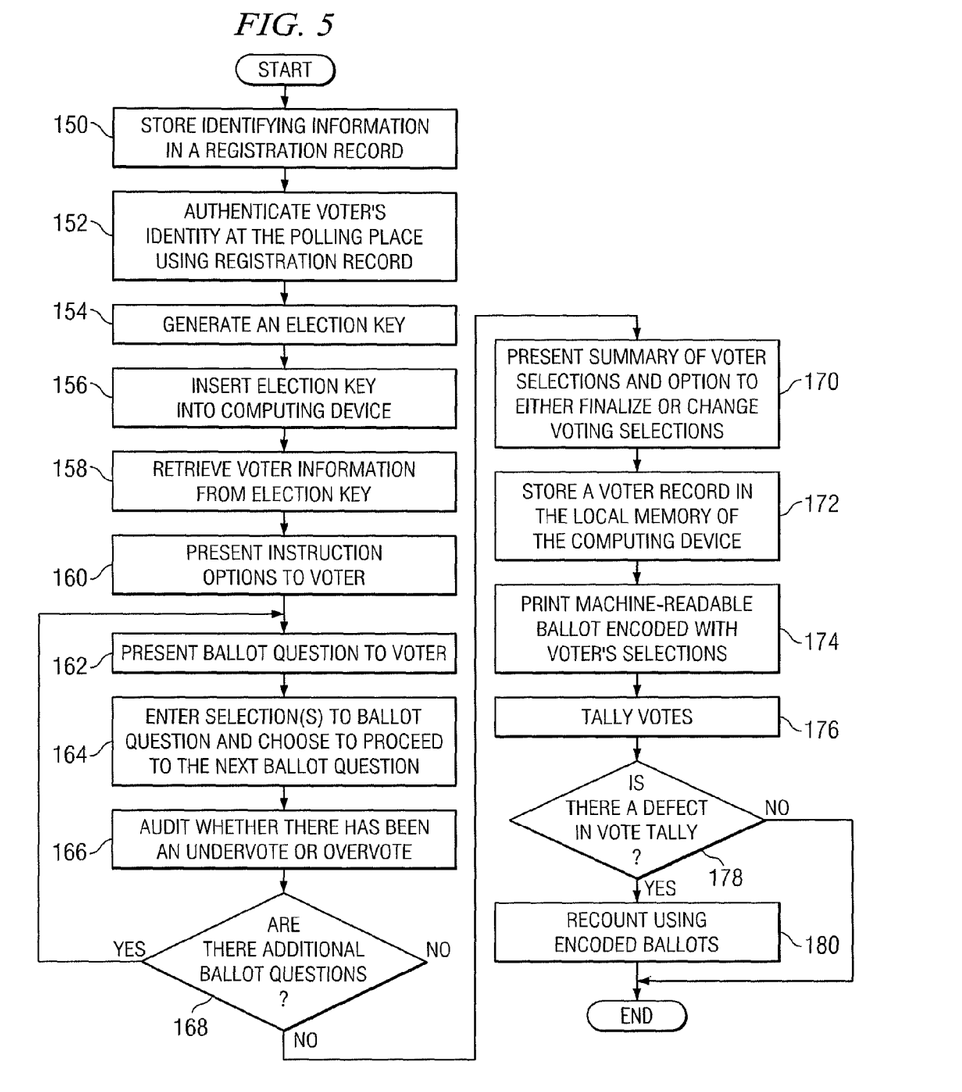
FIG. 5 illustrates an example method of using an advanced voting system.

FIG. 5 illustrates an example of a method for using advanced voting system 10. The method begins at step 150 by storing identifying information for a particular voter in registration record 17. As described in regard to FIG. 2, registration record 17 may contain the voter's name, address, precinct, and a digitized signature. Additionally or alternatively, voter may be required to submit one or more biometric samples, which may also be stored in registration record 17. When voter arrives at the polling place; a voter's identity may be authenticated at step 152 by comparing a presented signature or other identifying information with the digitized signature 62 or other identifying information stored in registration record 17. In embodiments utilizing biometric samples, a biometric sample 64 stored on registration record 17 may be compared to a biometric sample submitted at the polling place (instead of or in addition to the signatures being compared).

After voter's identity is authenticated, an election key 20 is generated at step 154 and given to the voter. An encoded digital signature 22 of the election judge for voter's precinct may be stored on election key 20. The voter inserts election key 20 into computing device 12 associated with a voting booth 24 (or a peripheral in communication with computing device 12) at step 156. Computing device 12 may communicate with election key 20 at step 158 to retrieve voter information. For example, voter information may include an electronic ballot to be used by the voter that was stored on election key 20 or information identifying an electronic ballot stored at computing device 12 to be used by the voter.

At step 160 after an appropriate ballot or other voter information is retrieved, computing device 12 presents an instruction screen to the voter to allow the voter to decide whether to see detailed instructions before voting. In one embodiment, step 160 may also include the voter choosing to listen to auditory instructions and donning headphones 28 connected to computing device 12. Alternatively, voter may choose at step 160 to forgo the instruction screens altogether. At step 162, the first ballot question 78 is presented to the voter. Example ballot questions 78 were described in greater detail above in regard to FIG. 3. Voter then enters voter selections to the ballot question at step 164. In one embodiment, step 164 includes the voter indicating a selection by typing on keyboard 32. In other embodiments, step 164 may include voter indicating a selection by clicking on mouse 26 or touching touch-sensitive monitor 34. As part of step 164 and after voter has indicated his voter selection, a screen may appear that informs the voter of how he may proceed to the next ballot question or return to the previous ballot question. Computing device 12 may audit voter's selection as a step 166 to determine whether there has been an undervote or overvote before proceeding to the next ballot question. Where such an irregularity is detected, computing device 12 may inform voter of the situation and may prompt voter to remedy the situation if local election laws allow. Alternatively this step may not be performed at all or may be performed after the voter has completed the ballot. At step 168, computing device 12 determines whether there are additional ballot questions to be presented to the voter. If additional questions exist to present to the voter, the method returns to step 162 and computing device 12 presents the next question to the voter. Computing device 12 will continue the process by proceeding through steps 162-168 until the last ballot question 78 is presented to the voter. After all ballot questions are presented to the voter, the method proceeds to step 170 where computing device 12 presents the voter with a summary of voter selections. In one embodiment, step 170 includes giving the voter the choice of either finalizing voting selections as they appear in the summary or returning to previous screens to change his voting selections before finalizing his voter selections. Where voter chooses to return to previous screens, the method will return to step 162 and proceed forward from there. At step 172 the voter's selections are stored in an anonymous voting record 38. Multiple voting records 38 may be used for audit purpose when irregularities are discovered or when a vote is challenged.

As described above, computing device 12 may be coupled to ballot generator 30. Step 174 includes production of a machine-readable encoded ballot 36 by ballot generator 30. Encoded ballot 36 may be encoded with the voter's selections. At step 176, voter selections are tallied. In one embodiment, the multiple encoded ballots may be tallied by a tallying computing device 42. Step 176 may include feeding the encoded ballots 36 to a ballot reader 37 that tallies the votes at each precinct. Alternatively or additionally, step 176 may include tallying encoded ballots 36 at a centralized location. In such embodiment, encoded ballots 36 may be carried to the centralized location or may be electronically transmitted to the centralized polling place. As a further alternative, step 176 may include tallying the multiple anonymous voting records 38 generated by computing device 12 to produce precinct totals.

At step 178, a determination is made as to whether any irregularities have occurred in either the tallying process or the selections cast. This determination may be made by a computing device, the tallying computer, a ballot reader, or a person associated with the election authority. If such a problem has occurred, the method may continue by recounting encoded ballots at step 180. Additionally or alternatively, voting records 38 as stored in computing device 12 may be recounted to provide an additional check on ballot totals. Recounts may also be made using a substantially similar procedure as described in above with regard to step 178 in response to requests by candidates or others challenging election results.

Computing device 12 may proceed through the voting process in the order as shown in steps 150-180 in FIG. 5 and as described above. However, it is recognized that one skilled in the art may perform the steps of the method in any suitable order.

Figure 6:
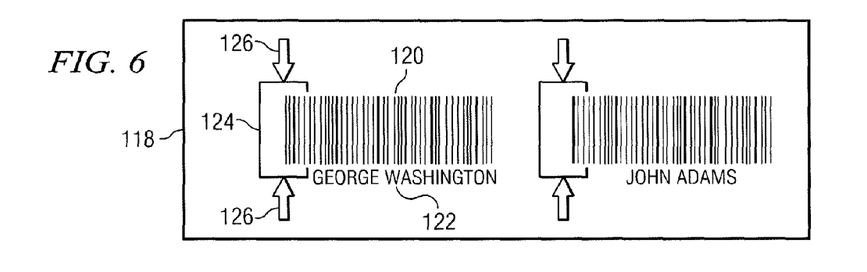
FIG. 6 illustrates an example system for absentee voting.

FIG. 6 illustrates an example system for absentee voting. Absentee ballots 118 can play an important role in an election. It is difficult to ask voters to prepare a machine-readable ballot expressing the voter's intent. Such ballots are generally prepared by a machine and such machines are not likely to be available to an absentee ballot voter. Some prior art systems attempted to solve this problem by supplying the absentee voter with pre-printed bar coded stickers containing encoding pertaining to all candidates. In addition to being expensive, adhesive labels may be destroyed prior to reaching the user or adhesive labels may become subsequently stuck in a reading machine.

One embodiment of the present invention allows absentee ballots 118 to be distributed to voters without such adhesive backing As shown in FIG. 6, associated with each candidate is a bar code 120 that contains an encrypted code that will define the voter's choice. The ballot also contains an identifying area 122 with the name, picture, and/or other information identifying the candidate. Near the start of the bar code is a box 124 and two arrows 126 straddling bar code 124. When indicating a choice, the absentee ballot voter is asked to fill in box 124 between the pair of arrows 126 with a pen or pencil. When box 124 is filled in, the appropriate bar code will be obliterated. For an example to demonstrate this technique, assume that bar code 124 for candidate George Washington contains the code "2." Assume that the bar code 124 for candidate John Adams contains the code "1." When the voter fills in box 124 in order to vote for George Washington, the code "2" will no longer be able to be read by the machine reader. When read, the absence of the code associated with the candidate along with the codes (not obliterated of the other candidates for the same office) unequivocally indicates the voter's choice in a machine-readable fashion.

Although FIG. 6 illustrates absentee ballot 118 as including bar code 120, absentee ballot 118 may include any other machine-readable means for indicating a voter selection. Each machine-readable area may be proximate to and associated with identifying area 122. In one example, the machine-readable area may include a symbol or character that may be marked or otherwise altered by a voter to indicate the voter's selection. Accordingly, machine-readable area may include one or more dashes, underscores, or a box proximate to identifying area 122. A voter may indicate a voter selection by checking or otherwise marking the dashes, underscores, or box.

In another example, absentee ballot 118 may include a series of numbers and/or letters associated with each candidate. In particular embodiments, the numbers and/or letters may be printed using magnetic ink character recognition (MICR) technology. MICR is a character recognition system that uses special ink and characters. MICR provides a secure, high-speed method of scanning and processing information.

When absentee ballot 118 that contains encodings printed in MICR ink is to be read, absentee ballot 118 is passed through a machine having MICR reading capabilities. The machine magnetizes the ink and then translates the magnetic information into characters. For reading and decoding absentee ballots 118, any computing system or ballot reader, such as ballot reader 37, vote tallying reader 39, and tallying computer 42 may include software enabling MICR recognition and translation.

In making a voter selection, the voter may be requested to obliterate or alter the machine-readable area. For example, the voter may be requested to scratch through the machine-readable area associated with the candidate for whom the voter is selecting. When scratched through or otherwise altered, the machine-readable area associated with a candidate and the corresponding identifying area 122 will no longer be readable by the machine reader. In this example, the absence of a code associated with the candidate along with the codes not obliterated for the other candidates for the same office unequivocally indicates the voter's choice in a machine-readable fashion.

In other embodiments, the voter may be requested to obliterate or alter the machine-readable areas associated with each candidate that the voter is not selecting. In these embodiments, the scratched through or obliterated machine-readable area will not be readable by the machine reader. The only machine-readable area that will be detected and read by the machine reader will be the machine-readable area that the voter has not marked or altered. In this example, when read, the presence of the code associated with the candidate chosen and the absence of any other machine-readable codes unequivocally indicates the voter's choice in a machine-readable fashion. Regardless of the type of machine-readable indicator used, possible technical advantages of such a system are improved accuracy and rate of speed in counting absentee ballots 118. After absentee ballots 118 are read, tallying system 40 may be used to count such absentee ballots 118.

Although the present invention has been described with several embodiments, numerous changes, substitutions, variations, alterations, transformations, and modifications may be suggested to one skilled in the art, and it is intended that the present invention encompass all such changes, substitutions, variations, alterations, transformations, and modifications as fall within the spirit and scope of the appended claims.

What is claimed is:

1. An advanced voting system, comprising:
one or more computing devices operable to:
receive input of authentication data;
utilize the authentication data to determine whether a voting session by a voter is authorized and to unlock ballot information specific to the voter or a group of voters;
receive accessibility input data on the same device used to unlock said ballot information;
present ballot questions to the voter if the voting session is authorized; and
receive interactive voter selections from the voter; and
a record generator operable to generate at least two records containing the voter selections.

2. The system of claim 1, wherein:
the advanced voting system further comprises an election key generator operable to generate a tangible election key storing information related to a voter and storing the authentication data;
the one or more computing devices are further operable to:
interface with the election key; and
retrieve the authentication data from the election key.

3. The system of claim 1, wherein the authentication data comprises a digital signature.

4. The system of claim 1, further comprising at least one record reader, each record reader operable to present the voter selections included on at least one of the records to the voter to allow the voter to verify the voter selections.

5. The system of claim 1, wherein:
the one or more computing devices are further operable to present an option to the voter allowing the voter to choose to write-in one or more voter selections; and
the record generator is further operable to include write-in selections on at least one of the tangible records.

6. The system of claim 1, wherein the one or more computing devices are further operable to:
receive instructions from the voter to adjust a color of a screen of one of the computing devices, the color adjustment instructions indicated by the voter's selection of one or more non-dedicated selectors each associated with a specific color adjustment; and
execute the color adjustment instructions received from the voter.

7. The system of claim 1, wherein the screen color adjustments automatically return to a default value after the voter has completed a voting session.

8. The system of claim 1, wherein the one or more computing devices are further operable to receive instructions from the voter to adjust a volume of one of the computing devices, the volume adjustment instructions indicated by the voter's selection of one or more non-dedicated selectors each associated with a specific volume adjustment.

9. A method for advanced voting, comprising:
receiving input of authentication data at a voting booth;
utilizing the authentication data to determine whether a voting session by a voter is authorized and to unlock ballot information specific to the voter or a group of voters;
receiving accessibility input data on the same device used to unlock said ballot information;
presenting ballot questions to the voter if the voting session is authorized; and
receiving interactive voter selections from the voter; and
generating at least two records containing the voter selections.

10. The method of claim 9, further comprising:
generating a tangible election key storing information related to a voter and storing the authentication data;
retrieving the authentication data from the election key at the voting booth.

11. The method of claim 9, wherein the authentication data comprises a digital signature.

12. The method of claim 9, further comprising presenting the voter selections included on at least one of the records to the voter to allow the voter to verify the voter selections.

13. The method of claim 9, further comprising:
presenting an option to the voter allowing the voter to choose to write-in one or more voter selections; and
providing the write-in selections on at least one of the records.

14. The method of claim 9, further comprising:
receiving instructions from the voter to adjust a color of a screen of the voting booth, the color adjustment instructions indicated by the voter's selection of one or more non-dedicated selectors associated with a specific color adjustment; and
executing the color adjustment instructions received from the voter.

15. The method of claim 9, wherein the screen color adjustments automatically return to a default value after the voter has completed a voting session.

16. The method of claim 9, further comprising receiving instructions from the voter to adjust a volume associated with the voting booth, the volume adjustment instructions indicated by the voter's selection of one or more non-dedicated selectors associated with a specific volume adjustment.

17. A system comprising one or more computing devices operable to:
receive input of a user's identity;
receive additional data to verify the identity of the user;
verify the identity of the user using the additional data;
receive instructions from the user to adjust the level of magnification of a screen of the computing device, the magnification adjustment indicated by the user's selection of anon-dedicated element of the system associated with the magnification adjustment;
execute the magnification adjustment instructions received from the user;
present interactive choices to the user to perform a transaction;
receive at least one tangible input document not initially prepared by the user said tangible input document containing Magnetic Ink Character Recognition (MICR) characters;
allow the user to make a final selection of the user's choices;
allow the user to start over if the user's choices are not confirmed;
process a transaction using the input document; and
create a computer record of at least some of the user's choices.

18. The system of claim 17, wherein the user may adjust the level of magnification of the screen by selecting the non dedicated element of the system.

19. The system of claim 17, wherein the user may select a portion of the screen to magnify.

20. A method, comprising:
receiving input of a user's identity;
receiving additional data to verify the identity of the user;
verifying the identity of the user using the additional data;
receiving instructions from the user to adjust the level of magnification of a screen of a computing device, the magnification adjustment indicated by the user's selection of an non dedicated element of the screen associated with the magnification adjustment;
executing the magnification adjustment instructions received from the user;
presenting interactive choices to the user to perform a transaction;
receiving at least one tangible input document not initially prepared by the user said tangible input document containing Magnetic Ink Character Recognition (MICR) characters;
allowing the user to make a final selection of the user's choices;
allowing the user to start over if the user's choices are not confirmed;
processing a transaction using the input document; and
creating a computer record of at least some of the user's choices.

21. The method of claim 20, further comprising adjusting the level of magnification of the screen by selecting the non dedicated element.

22. The method of claim 20, further comprising selecting a portion of the screen to magnify.

* * * * *